United States Patent
Stefanczyk et al.

(10) Patent No.: US 9,772,183 B2
(45) Date of Patent: Sep. 26, 2017

(54) FLYING SENSOR HEAD

(71) Applicant: Rudolph Technologies Inc., Flanders, NJ (US)

(72) Inventors: Wojciech Stefanczyk, Woodland Park, NJ (US); James Francis Kane, Spart, NJ (US); Michael Colgan, Flanders, NJ (US); James Abondolo, Budd Lake, NJ (US)

(73) Assignee: RUDOLPH TECHNOLOGIES INC., Flanders, NJ (US)

( * ) Notice: Subject to any disclaimer, the term of this patent is extended or adjusted under 35 U.S.C. 154(b) by 296 days.

(21) Appl. No.: 14/409,756

(22) PCT Filed: Jun. 27, 2013

(86) PCT No.: PCT/US2013/048256
§ 371 (c)(1),
(2) Date: Dec. 19, 2014

(87) PCT Pub. No.: WO2014/004873
PCT Pub. Date: Jan. 3, 2014

(65) Prior Publication Data
US 2015/0323320 A1     Nov. 12, 2015

Related U.S. Application Data (60) Provisional application No. 61/666,362, filed on Jun. 29, 2012.

(51) Int. Cl.
*G01B 11/00*     (2006.01)
*G01B 21/04*     (2006.01)

(52) U.S. Cl.
CPC .......... *G01B 21/047* (2013.01); *G01B 11/005* (2013.01)

(58) Field of Classification Search
None
See application file for complete search history.

(56) References Cited

U.S. PATENT DOCUMENTS

| | | | | |
|---|---|---|---|---|
| 5,127,727 A | * | 7/1992 | Arnold | G01N 21/8806 356/237.1 |
| 6,438,856 B1 | * | 8/2002 | Kaczynski | G01B 5/0004 33/503 |

(Continued)

FOREIGN PATENT DOCUMENTS

| | | |
|---|---|---|
| JP | 2008-251898 A | 10/2008 |
| KR | 10-0634652 | 10/2006 |
| TW | 536622 B | 6/2003 |

OTHER PUBLICATIONS

International Search Report and Written Opinion for International Application No. PCT/US2013/048256 mailed Sep. 25, 2013 (13 pages).

(Continued)

*Primary Examiner* — Kara E Geisel
*Assistant Examiner* — Amanda Merlino
(74) *Attorney, Agent, or Firm* — Merchant & Gould P.C.

(57) ABSTRACT

The present disclosure provides a system and method of optical inspection of substrates that have relative large variations in topography. The present disclosure provides a system wherein optical components of the optical inspection system can be automatically moved vertically towards or away from the substrate during optical inspection of the substrate. The system moves the optics in a controlled and precise manner, thereby enabling accurate on-the-fly inspection of substrates having a large variation in topography.

13 Claims, 6 Drawing Sheets

(56) References Cited

U.S. PATENT DOCUMENTS

| | | | |
|---|---|---|---|
| 6,473,161 B1* | 10/2002 | Cuijpers | G03F 7/709 355/53 |
| 2002/0145733 A1 | 10/2002 | Wada et al. | |
| 2020/0145733 | 10/2002 | Wada et al. | |
| 2004/0031779 A1 | 2/2004 | Cahill et al. | |
| 2009/0251163 A1* | 10/2009 | Yamada | G01R 31/2891 324/754.01 |
| 2010/0101082 A1 | 4/2010 | Utsumi | |
| 2010/0265518 A1 | 10/2010 | Bills et al. | |

OTHER PUBLICATIONS

Search Report from corresponding Taiwanese Patent Application No. 102123264, dated Mar. 7, 2017.

* cited by examiner

FLYING SENSOR HEAD

CROSS REFERENCE TO RELATED APPLICATIONS

This application is being filed on 18 Dec. 2014, as a US National Stage of PCT International patent application No. PCT/US2013/048256, filed 27 Jun. 2013 which claims benefit to U.S. Provisional Application Ser. No. 61/666,362 filed Jun. 29, 2012, and which applications are incorporated herein by reference in their entireties.

BACKGROUND

In many optical systems, the lenses, objectives or other optical elements that direct light onto a surface and/or receive light back from a surface are essentially fixed with respect to the object that is being imaged or analyzed. The only movement that is typically provided for is that which is required to properly focus the optical system on the object. Given the high resolution of most modern optical systems, this amount of movement is quite small. One skilled in the art will appreciate that the amount of travel of an optical system that is required for focusing is dependent on the resolution of the optical system.

In some applications the variation in topography of the substrate that is being analyzed is sufficiently large so that some of the features are out of the focus range of the optics at any set distance between the optics and the substrate. Some optical systems have been developed to accommodate this scenario by raising and lowering the substrate relative to the optics during the optical inspection of the substrate. Repeatedly raising and lowering the substrate can cause damage to the substrate and/or result in slow and inaccurate and inefficient inspection thereof, and can also be very difficult if not impossible to accomplish depending on the size and nature of the substrates. There is a need for improved optical systems and methods that are able to inspect substrates that have relative large variations in topography.

SUMMARY

The present disclosure provides a system and method of optical inspection of substrates that have relative large variations in topography. The present disclosure provides a system wherein optical components of the optical inspection system can be automatically moved vertically towards or away from the substrate during optical inspection of the substrate. The system moves the optics in a controlled and precise manner, thereby enabling accurate on-the-fly inspection of substrates having a large variation in topography.

DETAILED DESCRIPTION

Referring to FIGS. 1-5, an embodiment of an inspection system and method according to the present disclosure is described in further detail. In the depicted embodiment the inspection system 10 includes a substrate stage 12 that is configured to support a substrate (i.e., the object of inspection such as a patterned semiconductor wafer, an LCD screen, etc.) and move the substrate in the X-Y plane (horizontal plane) relative to an optics assembly 14 during inspection thereof.

In the depicted embodiment the optics assembly 14 includes an optics sub-assembly that extends downward towards the substrate stage 12. The optics sub-assembly is also referred to herein as a flying sensor head assembly 16. In the depicted embodiment the flying sensor head assembly 16 is configured to move optical components in a vertical direction (Z-direction) towards and away from the substrate stage 12 during inspection. The upwards and downward motion of the sensor head assembly 16 can be based on the topography of the substrate. For example, when certain optical components of the flying head sensor are oriented above a relatively raised feature on the substrate (a high point), the flying head sensor automatically moves optical components upwardly so that the optics can focus on the raised feature. Likewise, when certain optical components of the flying head sensor are above a relatively depressed (a low point) feature on the substrate, the flying head sensor automatically moves optical components downwardly so that the optics can focus on the relatively low feature. This ability of the flying head assembly 16 to move optical components towards and away from the substrates during inspection (terrain following) enables fast and accurate inspection of substrates that include features that are located in spaced-apart vertical planes, especially wherein the spaces between the vertical planes exceed the range of focus of standard high precision inspection optics. For example, the flying head sensor assembly 16 is particularly advantageous for the inspection of delicate substrates that include features thereon that are in vertical planes spaced more than 8 mm apart (e.g., LCD screens).

As described above, FIG. 1 is a depiction of a particular embodiment of the present disclosure. It should be appreciated that many alternative embodiments of the present disclosure are possible. For example, in an alternative embodiment a sensor head sub-assembly could be configured to move in all three directions during inspection (X, Y and Z) or in two directions such as the Z direction and the Y direction during inspection. In embodiments where the flying head sensor moves in all three directions, the substrate could remain stationary during inspection, and in embodiments where the flying sensor head can move in both the Z and Y directions, the substrate need only be moved in the X direction. It should be appreciated that in alternative embodiments the inspection system can be of a variety of different types and may include a different arrangement and configuration (different chassis structure, different structure to hold and move the substrate during inspection, different optics configuration, etc.). The depicted embodiment is an example configuration and application of the present disclosure.

Referring to FIGS. 2-5, the flying sensor head assembly 16 is described in further detail. In the depicted embodiment the flying sensor head assembly 16 can raise and lower the optics thereby shifting a focal plane of the optical system by as much as an inch (+/−0.5 inches). In another embodiment the focal plane of the sensor head 16 may be moved by as much as two inches (+/−1.0 inches) about a nominal position. In alternative embodiments of the flying sensor head assembly 16, even larger vertical travel distances may be achieved.

Figure 1:
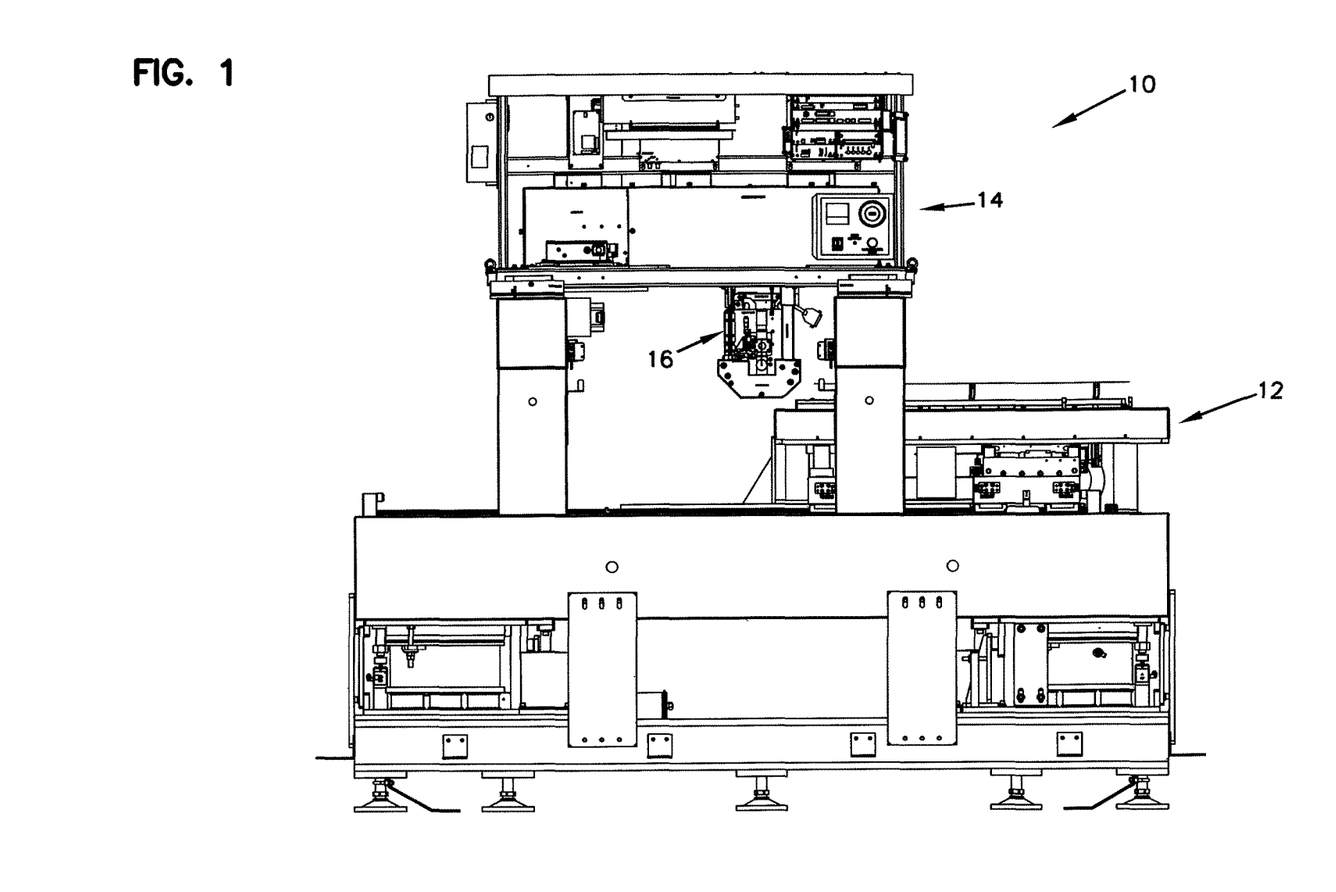
FIG. 1 is a front elevation view of one embodiment of an inspection system according to the present disclosure.
Figure 2:
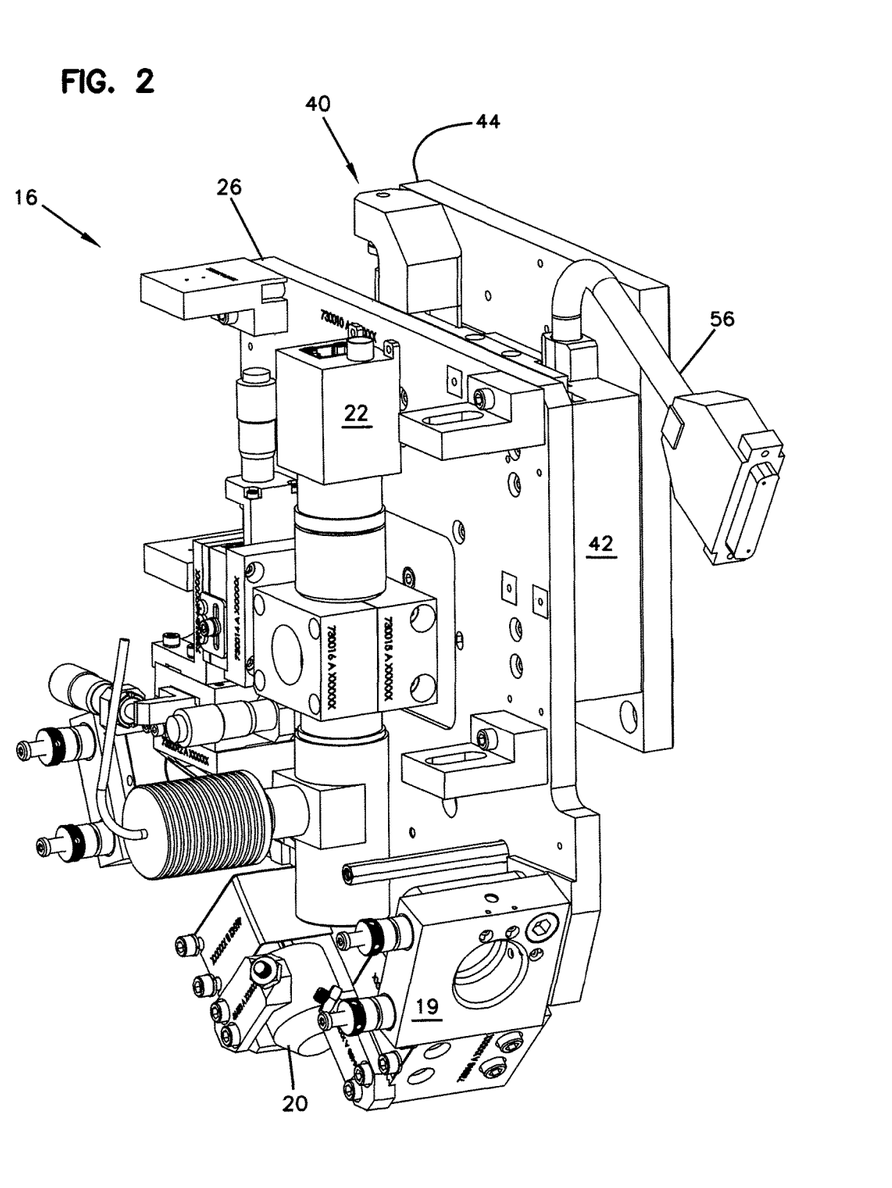
FIG. 2 is a perspective view of a flying sensor head of the inspection system of FIG. 1.
Figure 3:
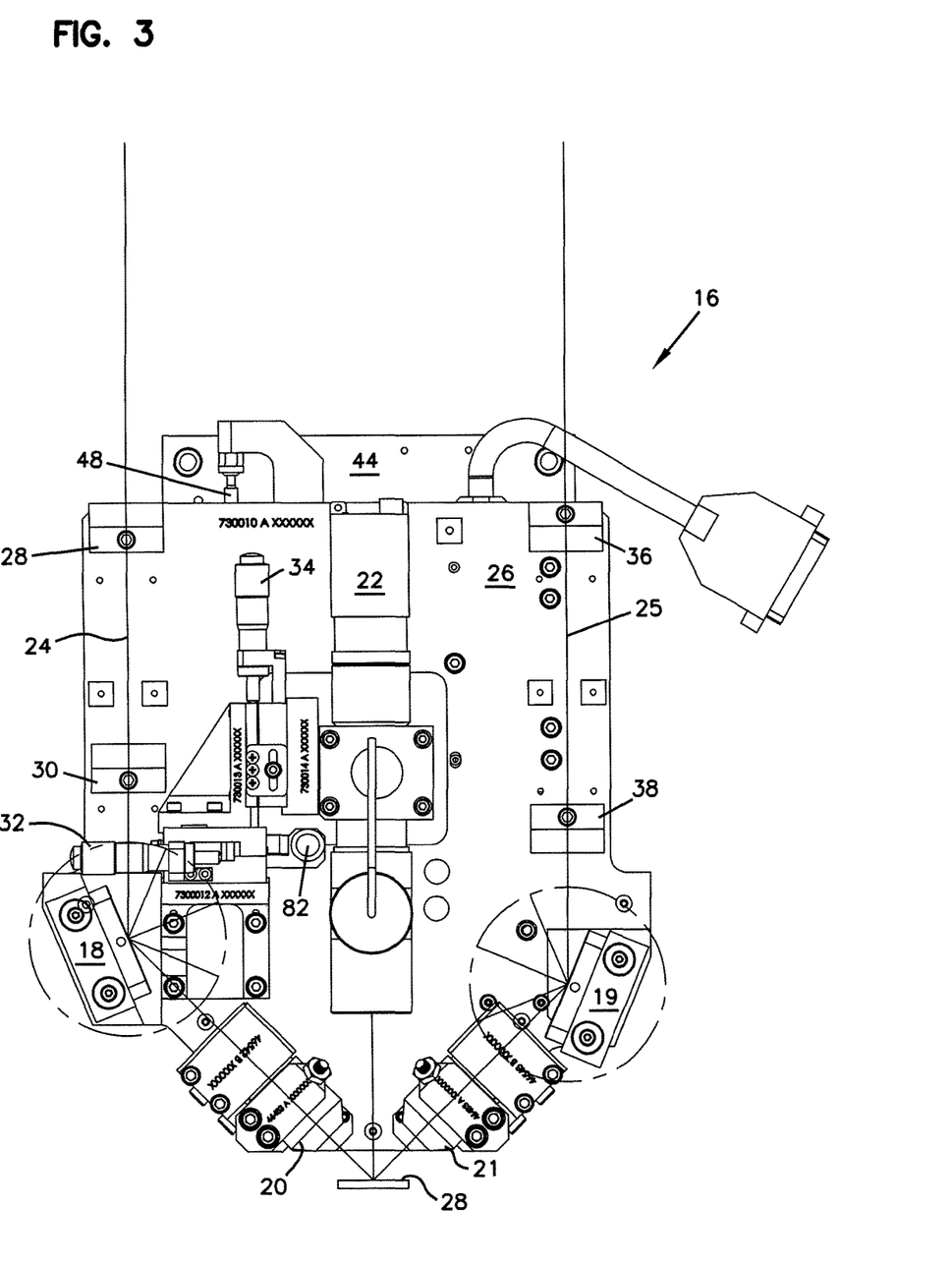
FIG. 3 is a front elevation view of the flying sensor head of FIG. 2.
Figure 4:
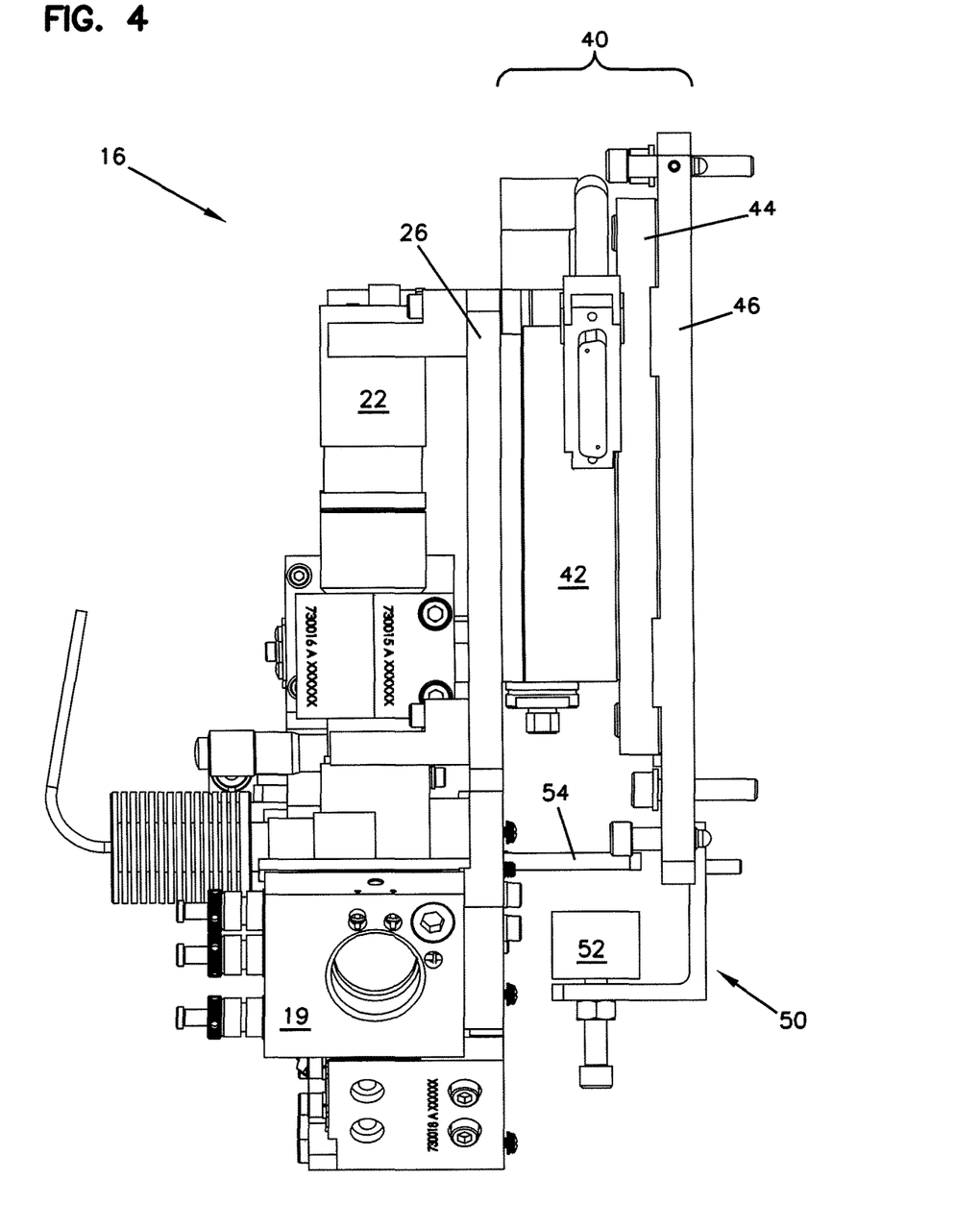
FIG. 4 is a first side elevation view of the flying sensor head of FIG. 2.
Figure 5:
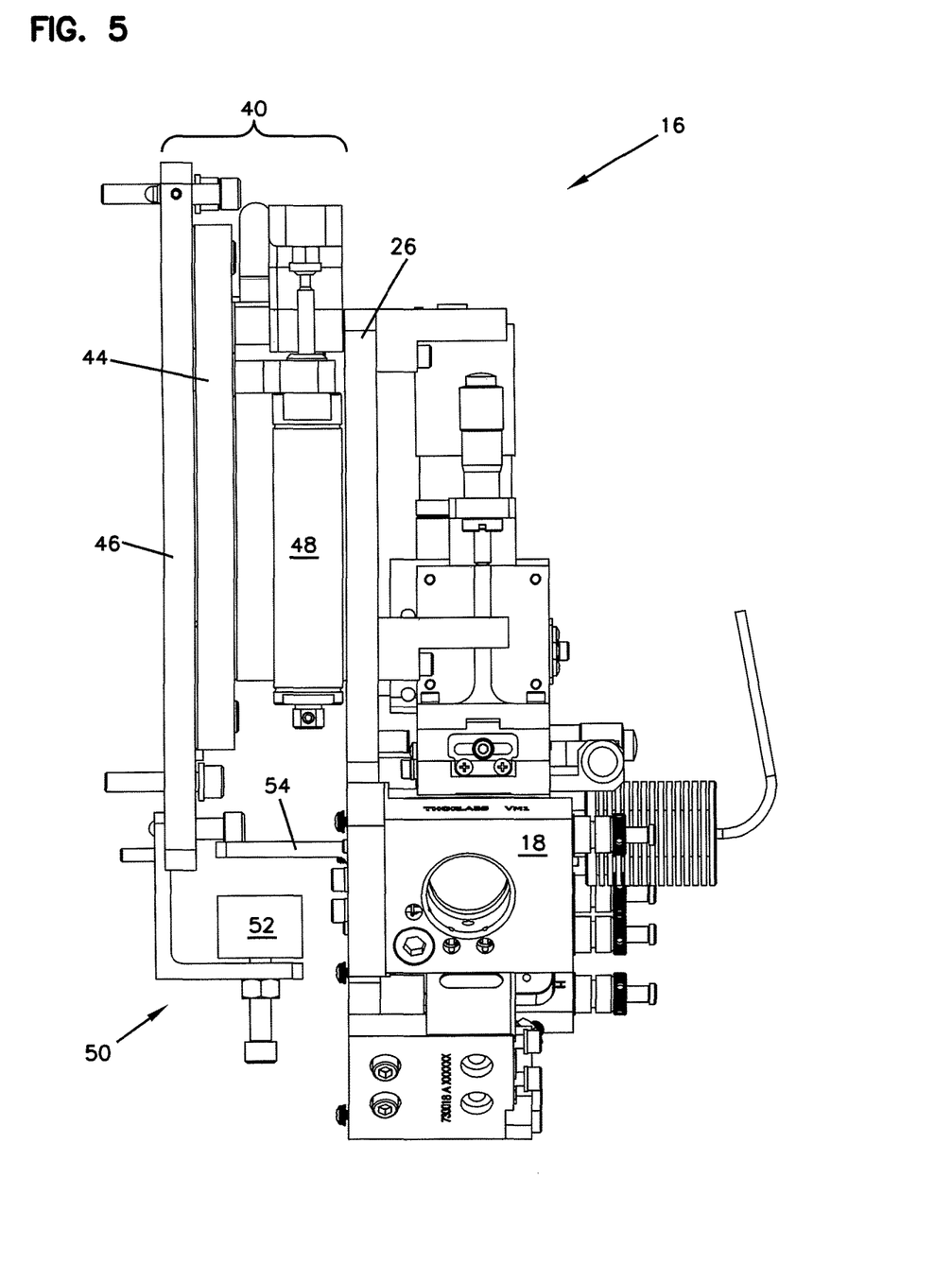
FIG. 5 is a second side elevation view of the flying sensor head of FIG. 2.

In the depicted embodiment optical elements 18, 20 for directing and focusing a beam of light 24 onto a surface 28 of a substrate, and optical elements 19, 21 for collecting and collimating light from the beam of light 25 reflected from the surface, as well as other optical elements 22 are attached to a movable plate 26 by an alignment assembly 82 (towards and away from the movable plate 26 adjustment), 28, 30, 32 (left and right adjustment), 34 (up and down adjustment), 36, 38 (see FIG. 3). While in the depicted embodiments the above-identified optical elements located at a distal end of the flying sensor head 16 are arranged in an oblique incidence input/output arrangement, it is specifically intended that normal incidence arrangements may also be useable.

In the depicted embodiment, mirrors or other coupling elements couple an optical or electromagnetic beam to sensors, filters, and other conditioning and/or relay elements of a typical metrology system are located in the optics assembly 14 above the flying sensor head 16. In one embodiment the relay mirrors optically couple the sensor head optics 18, 19, 20, 21, 22 to an opto-acoustic metrology system such as the type of system sold by Rudolph Technologies, Inc. under the mark MetaPulse®. In another embodiment, the sensor head optics are coupled to a metrology system such as an ellipsometer. One example of an ellipsometer that may be used with the present invention is the S3000™ ellipsometry system sold by Rudolph Technologies, Inc. In another embodiment, the sensor head forms part of an optical inspection system such as that sold under the trademark AXI™, again from Rudolph Technologies. Additional metrology and inspection systems and other sensors of the type commonly used in semiconductor manufacturing processes may be adapted to utilize the flying sensor head 16 of the present disclosure. Examples include confocal optical systems, spectroscopes of various types, Shack-Hartman sensors, interferometers, and the like. As discussed above, the optics assembly 14 can include a variety of different alternative configurations.

In the depicted embodiment, the movable plate 26 is connected to a chassis/frame of the optics assembly 14 via an optics stage assembly 40, also referred to herein as a bracket assembly. The optics stage assembly 40 provides a degree of vertical travel to the flying sensor head assembly that greatly expands the utility of the flying sensor head assembly 16. In the depicted embodiment, vertical movement of the flying sensor head assembly 16 is accomplished by an electronically controlled actuator such as a stepper 42 coupled between the movable plate 26 and a base plate 44. In the depicted embodiment the base plate 44 is connected to a leveling plate 46, also referred to herein as an alignment adjustment plate (see FIGS. 4-5). In the depicted embodiment the alignment adjustment plate 46 includes three points of contact with the base plate 44, thereby allowing the movable base plate 44 to be adjusted for rotation both about a vertical and a horizontal axis. The adjustment of the base plate 44 results in the adjustment of the optics mounted to the movable plate 26 given the secure connection between the movable plate 26 and the base plate 44 via the stepper 42.

In the depicted embodiment a single very high resolution actuator (e.g., a stepper) 42 capable of moving the stage in increments approaching a nanometer in magnitude is coupled between the portions of the optics stage assembly 40. In other embodiments, multiple steppers/actuators working in parallel or in series are included to accomplish both high and coarse adjustment of the stage portions relative to one another.

In the depicted embodiment the stage assembly 40 includes a component that supports the mass (mass support device) of a portion of movable plate 26 and the optical elements attached thereto. The mass support device, also referred to herein as an inductor, lessens the weight load on the stepper 42. In the depicted embodiment the mass support device is a pneumatic cylinder (gas cylinder) 48 that is coupled between the movable plate 26 and the base plate 44 in parallel with the stepper 42. In the depicted embodiment the pneumatic cylinder has no external moving parts (except for the piston that extends therefrom), and therefore is particularly suited for clean room type inspection applications. It should be appreciated that other types of mass support devices can also be used including, for example, a spring-based configuration, a hydraulic cylinder configuration, or a secondary electronic controlled actuator such as a stepper. In the depicted embodiment the pneumatic cylinder 48 is preloaded to carry approximately the weight of the lower movable portion of the flying sensor head 16 (the movable plate 26 and the optical elements attached thereto). The preloading of the pneumatic cylinder 48 removes a great deal of stress and resistance from the stepper 42 of the stage, and allows for faster and more precise adjustment of the stage and hence the optical components on the movable plate 26.

In the depicted embodiment the pneumatic cylinder 48 is provided with a mechanism for increasing, decreasing or maintaining the pressure within the cylinder to accommodate positional adjustment of the optics stage assembly 40 and to damp out vibrations or elastic movements of the lower movable portion of the flying sensor head 16 (the movable plate 26 and the optical elements attached thereto) relative to the upper portion (e.g., base plate 44), which in the depicted embodiment is fixed. In the depicted embodiment the mechanism is an adjustable aperture that leaks air at a known rate, used in combination with a pressure gauge to replenish air lost through the aperture. In other embodiments the adjustment mechanism is dynamically controlled in conjunction with the stepper to increase, decrease or maintain pressure in the cylinder to allow or restrict movement of the stage, as needed. For example, when a movement of the stepper 42 is undertaken, the volume within the pneumatic cylinder is modified. In some instances air is emitted from the pneumatic cylinder to reduce the amount of force required for the stepper to counteract the preloading force of the pneumatic cylinder (e.g., when the movement of the stepper would act to compress air within the pneumatic cylinder). Conversely, where the stepper is actuated to move the stage in a manner that would tend to reduce pressure within the cylinder, air is added to the cylinder to maintain the preloading force exerted by the cylinder. In the depicted embodiment electrical power as well as control signals are transmitted to the optics stage assembly 40 via wires (e.g., pin connector 56).

In the depicted embodiment the effective travel of the stage is controlled by the pneumatic cylinder 48 and the stepper 42. Using longer cylinders and steppers increases the travel of the stage and, hence, the flying sensor head assembly 16. In the depicted embodiment a bumper stop assembly 50 is connected to the leveling plate 46. The bumper stop assembly 50 includes a rubber stopper 52 that would engage a stop bar 54 that extends away from the back side of the movable plate 26, if the stepper 42 and/or the pneumatic cylinder 48 malfunctions. Therefore, the stop assembly 50 is configured to prevent damages to the optics as well as to the substrate under inspection due to contact between the two.

As described above, the flying sensor head of the depicted embodiment is configured to move in the Z direction during inspection. In the depicted embodiment during inspection the substrate is automatically moved by the stage in an X-Y plane to pass the substrate under an optical sensor head. The flying head assembly determines whether the features under the sensor are too close or too far from the lenses 20, 21 for proper inspection. This determination can be accomplished by sending a particular type light through mirror 18, lens 20, lens 21 and back up via mirror 19. Alternatively, the camera 22 can be used to make the determination as well. The camera could otherwise be used to visually locate the flying head assembly 16 in the horizontal plane relative to the substrate. The system is figured to determine whether movement of the flying head sensor in the Z direction is warranted and if so move the optics accordingly. As discussed above, the movement is accomplished by optics stage 40. In the depicted embodiment the precise controlled movement of the optics is accomplished via the coordinated control of the cylinder 48 and the stepper 42. Once the optics reach their target high, the features below the optics can be inspected and the process can be repeated until inspection of the substrate is complete.

Figure 6:
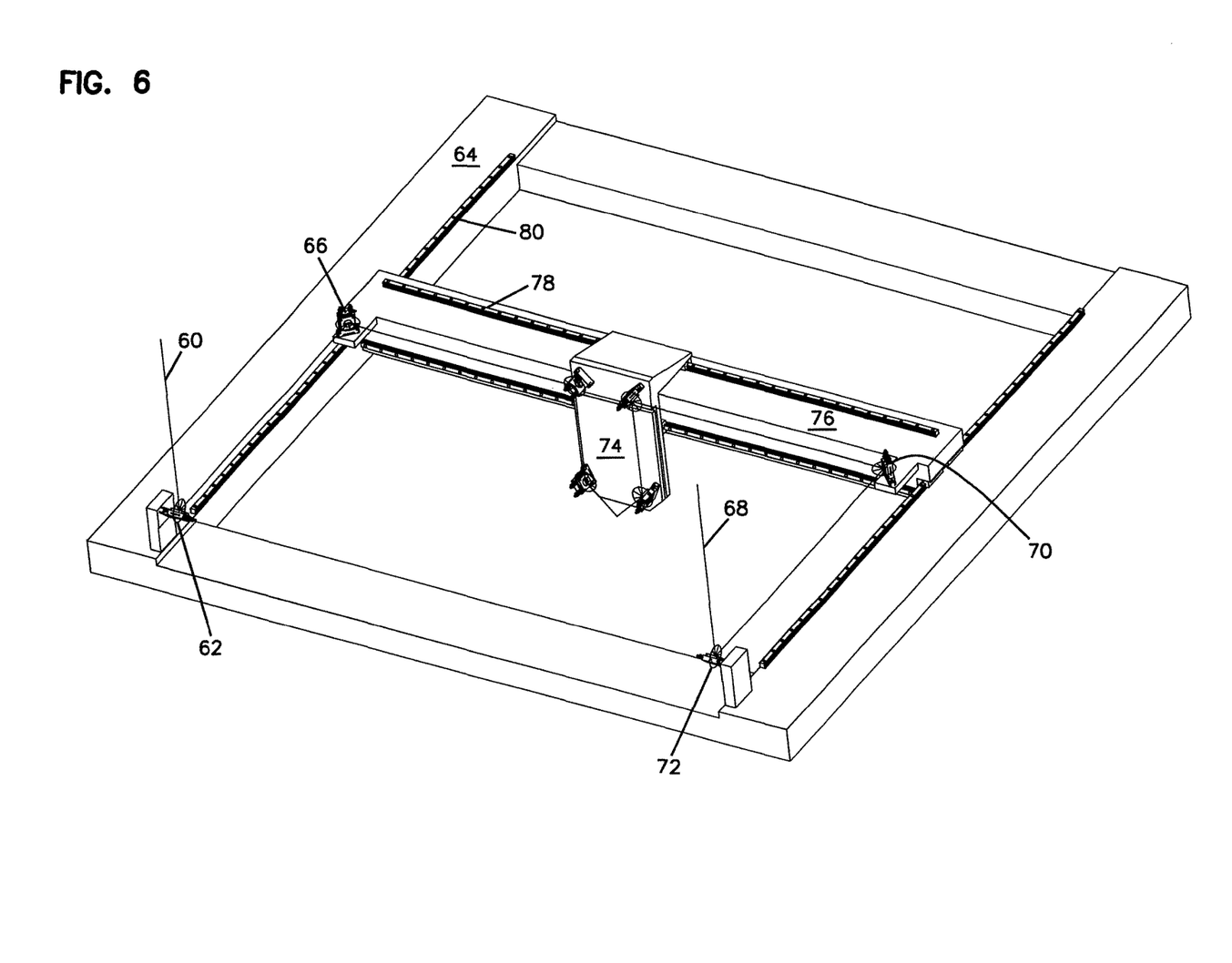
FIG. 6 is a schematic view of an alternative embodiment of the present disclosure.

As discussed above, it should be appreciated that the flying sensor head assembly 16 could also be configured to move in either or both of the X and Y directions as well. For example the leveling plate 46 could be mounted to a second stepper that move the flying head sensor in either or both of the X and Y directions instead of being fixedly mounted to the optics assembly 14. FIG. 6 depicts an example embodiment wherein the flying head sensor moves in the Z direction as well as the X and Y directions. In the depicted embodiment the flying head assembly 74 is mounted on a cross member 76 and is driven in the Y direction along tracks 78 that are mounted to the cross member 76. The cross member 76 is itself driven in the X direction along a pair of tracks 80 that are fixed to the optic assembly base frame 64. In the depicted embodiment a light beam 60 is reflected off an angled mirror 62 mounted on the optics head chassis base frame 64 to mirror 66 mounted on the cross member 76, which directs the light beam 60 to the flying head assembly 82. A return light beam 68 from the flying head assembly is reflected off mirror 70 on the cross member to mirror 72 on the base frame 64 back to the main compartment of the optics assembly. Alternatively, the optics assembly 14 could be configured to move as a whole in the X and Y directions and the flying sensor head could be connected fixedly to the optics assembly. It should be appreciated that the coupling mirrors may be provided with an adaptive adjustment mechanism that would allow the flying sensor head 16 to be gimbaled or moved along complex XYZ paths relative to the chassis to which it is coupled. These additional degrees of freedom would allow the flying sensor head to be used to inspect highly variable topographies of selected substrates without moving the substrates, which may be advantageous in certain applications.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An optical system comprising:
   a substrate stage configured to support a substrate during inspection;
   an optics assembly including a sensor head positioned above the substrate stage, the sensor head including:
      a movable mounting structure configured to be raised and lowered;
      at least one optical component mounted to the movable mounting structure that is configured to direct light towards the substrate stage;
      an electronically controlled actuator connected to the movable structure and configured to raise and lower the sensor head relative to the substrate stage; and
      a mass support device connected to the movable structure configured to support at least a portion of the weight of the movable mounting structure; and
   a bracket assembly that includes an alignment plate that aligns the at least one optical component mounted to the movable mounting structure, the alignment plate configured to be adjusted for rotation about both a vertical axis and a horizontal axis;
   wherein the alignment plate is located in a first vertical plane and the movable mounting structure is located in a second vertical plane, wherein the first vertical plane and the second vertical plane are offset, and wherein the alignment plate and the movable mounting structure overlap in the horizontal direction and define a gap between the alignment plate and the movable mounting structure, wherein the electronically controlled actuator and mass support device are at least partially housed within the gap.

2. The optical system of claim 1, wherein the mass support device includes an adjustable preloaded and a dynamically controlled adjustment mechanism configured to automatically maintain a target weight load on the mass support device during inspection.

3. The optical system of claim 1, wherein the at least one optical component mounted to the movable mounting structure includes a first mirror, a second mirror, a first lens, a second lens, and a camera.

4. The optical system of claim 1, wherein the mass support device is a gas cylinder.

5. The optical system of claim 1, wherein the mass support device is a gas cylinder and is incorporated in a mass support system, wherein the mass support system further comprises an adjustment mechanism that allows air to escape the gas cylinder and that provides additional gas to the gas cylinder to enable the gas cylinder to continuously support the weight of the movable mounting structure as the movable mounting structure is raised and lowered by the electronically controlled actuator.

6. The optical system of claim 1, wherein the mass support device includes an adjustable preloaded and a dynamic control mechanism, wherein the dynamic control mechanism is configured to automatically maintain the amount of weight load supported by the mass support device as the movable mounting structure raises and lowers during inspection.

7. The optical system of claim 1, wherein the movable structure is configured to move vertically as well as horizontally during inspection.

8. A flying sensor head comprising:
   focusing optics adapted to direct a sensor beam from an illumination source onto a substrate and to receive a modified sensor beam returned from the surface and direct it to a sensor that provides an output indicative of a characteristic of the substrate as a result of the incidence of the modified sensor beam thereon;

a support plate to which a mobile portion of the focusing optics are coupled, the support plate being movable relative to the substrate so as to position a focal plane defined by the focusing optics substantially at a surface of the substrate;

a mass support device coupled between the support plate and a mounting bracket to support substantially all of the mass of the support plate and the mobile portion of the focusing optics, wherein the mounting bracket is included in a bracket assembly that includes an alignment plate that aligns at least a portion of the focusing optics coupled to the support plate, the alignment plate configured to be adjusted for rotation about both a vertical axis and a horizontal axis;

an actuator coupled between the support plate and a mounting bracket to position the mobile portion of the focusing optics relative to the substrate;

a focus sensor for determining a position of the mobile portion of the optics relative to the substrate; and wherein the alignment plate is located in a first vertical plane and the support plate is located in a second vertical plane, wherein the first vertical plane and the second vertical plane are offset, and wherein the alignment plate and support plate overlap in the horizontal direction and define a gap between the alignment plate and the support plate, wherein the actuator and mass support device are at least partially housed within the gap.

9. The flying sensor head of claim 8, wherein the sensor beam is selected from a group consisting of polarized light, coherent light, monochromatic light, and broadband illumination.

10. The flying sensor head of claim 8, wherein the illumination source is adapted to provide a pump sensor beam and a probe sensor beam, the probe sensor beam being incident upon the sensor, the pump sensor beam being directed to a photon beam dump.

11. The flying sensor head of claim 8, wherein the flying sensor head is coupled to an inspection system selected from a group consisting of an ellipsometer, a polarimeter, a scatterometer, an opto-acoustic metrology system, an optical imaging inspection system, an interferometer, and a confocal imaging system.

12. The flying sensor head of claim 8, wherein the mass support device includes an adjustable preload and a dynamically controlled adjustment mechanism that are configured to automatically maintain a weight load on the mass support device during inspection.

13. The flying sensor head of claim 8, wherein the mass support device is a gas cylinder and wherein the mass support system further comprises a mechanism that allows air to escape the gas cylinder and that also provides additional gas to the gas cylinder to enable the gas cylinder to continuously support at least a portion of the weight of the mobile portion of the optics as the mobile portion of the optics is raised and lowered by the actuator.

* * * * *